United States Patent
Takahashi

(10) Patent No.: US 6,879,249 B2
(45) Date of Patent: Apr. 12, 2005

(54) VEHICLE OBSTACLE DETECTING APPARATUS

(75) Inventor: Hiroshi Takahashi, Komae (JP)

(73) Assignee: Nissan Motor Co., Ltd., Yokohama (JP)

(*) Notice: Subject to any disclaimer, the term of this patent is extended or adjusted under 35 U.S.C. 154(b) by 136 days.

(21) Appl. No.: 10/423,916

(22) Filed: Apr. 28, 2003

(65) Prior Publication Data

US 2003/0236605 A1 Dec. 25, 2003

(30) Foreign Application Priority Data

Jun. 19, 2002 (JP) ........................................ 2002-178060

(51) Int. Cl.[7] .............................................. B60Q 1/00
(52) U.S. Cl. .................... 340/435; 340/439; 701/301
(58) Field of Search ............................. 340/435, 436, 340/437, 438, 439, 576; 701/301

(56) References Cited

U.S. PATENT DOCUMENTS

| | | | | |
|---|---|---|---|---|
| 5,969,969 A | * | 10/1999 | Ejiri et al. ..................... | 701/41 |
| 6,256,565 B1 | * | 7/2001 | Yanagi et al. .................. | 701/45 |
| 6,574,540 B2 | * | 6/2003 | Yokota et al. ................. | 701/45 |
| 6,580,385 B1 | * | 6/2003 | Winner et al. ................. | 342/70 |
| 6,661,449 B1 | * | 12/2003 | Sogawa ....................... | 348/113 |

FOREIGN PATENT DOCUMENTS

JP    8-235359 A    9/1996

* cited by examiner

Primary Examiner—Toan N. Pham
(74) Attorney, Agent, or Firm—Shinjyu Global IP Counselors, LLP

(57) ABSTRACT

A vehicle obstacle detecting apparatus has an obstacle sensor, an obstacle detecting section, a vehicle response section, a driver operation storing section, a precision determining section and a threshold value updating section. The obstacle detecting section is configured to determine a presence of an obstacle around the vehicle to output a positive obstacle determination based on a similarity value between the detected obstacle information sent from the obstacle sensor and pre-stored obstacle detection reference information with a threshold value. The driver operation storing section is configured to store an average operation characteristic data calculated based on a driver operation. The precision determining section is configured to determine a detection precision of the obstacle by comparing an expected driver operation determined based on the average operation characteristic data with an actual driver operation. The threshold value updating section is configured to adjust the threshold value based on the detection precision.

20 Claims, 13 Drawing Sheets

VEHICLE OBSTACLE DETECTING APPARATUS

BACKGROUND OF THE INVENTION

1. Field of the Invention

The present invention relates to an apparatus for detecting an obstacle existing in the area surrounding a vehicle. More specifically, the present invention relates to an improvement of obstacle detection precision by adjusting a threshold value used to detect the obstacle.

2. Background Information

One existing device for detecting an obstacle in the area surrounding a vehicle utilizes a pattern matching method. In the pattern matching method, an obstacle is identified by comparing an image (detected pattern) obtained with a camera that photographs the area around the outside of the vehicle with a prepared reference pattern representing the image of an obstacle. An example of a conventional vehicle obstacle detecting apparatus that utilizes the pattern matching method is disclosed in Japanese Laid-Open Patent Publication No. 08-235359.

In view of the above, it will be apparent to those skilled in the art from this disclosure that there exists a need for an improved vehicle obstacle detecting apparatus. This invention addresses this need in the art as well as other needs, which will become apparent to those skilled in the art from this disclosure.

SUMMARY OF THE INVENTION

It has been discovered that the conventional vehicle obstacle detecting apparatus just mentioned is not able to precisely adjust the obstacle detection precision according to the determination result. More specifically, the above-mentioned apparatus cannot precisely adjust a reference value (threshold value) that is compared with a similarity value obtained by pattern matching of the detected pattern with the reference pattern to determine if an obstacle exists according to the determination result. Consequently, with the conventional vehicle obstacle detecting apparatus, it is difficult to perform the detection of the obstacle appropriately in response to the environment surrounding the vehicle. Thus, it is difficult to improve the detection precision of an obstacle.

The present invention was conceived in order to solve these problems and its object is to provide a vehicle obstacle detecting apparatus having improved obstacle detection precision.

In order to achieve the aforementioned object, a vehicle obstacle detecting apparatus is provided that comprises an obstacle sensor, an obstacle detecting section, a vehicle response section, a driver operation storing section, a precision determining section and a threshold value updating section. The obstacle sensor is configured and arranged to detect objects around a vehicle and to output detected obstacle information. The obstacle detecting section is configured and arranged to compare the detected obstacle information from the obstacle sensor and pre-stored obstacle detection reference information to produce a similarity value that is compared with a threshold value to determine a presence of an obstacle around the vehicle and to output a positive obstacle determination based on the similarity value and the threshold value. The vehicle response section is configured and arranged to produce a vehicle response upon the positive obstacle determination by the obstacle detecting section. The driver operation storing section is configured and arranged to detect a driver operation, and to store an average operation characteristic data calculated based on the driver operation. The precision determining section is configured and arranged to determine an expected driver operation upon the positive obstacle determination by the obstacle detecting section based on the average operation characteristic data, and to compare the expected driver operation with an actual driver operation to determine a precision of a detection of the obstacle. The threshold value updating section is configured and arranged to adjust the threshold value based on the precision of the detection of the obstacle determined in the precision determining section.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
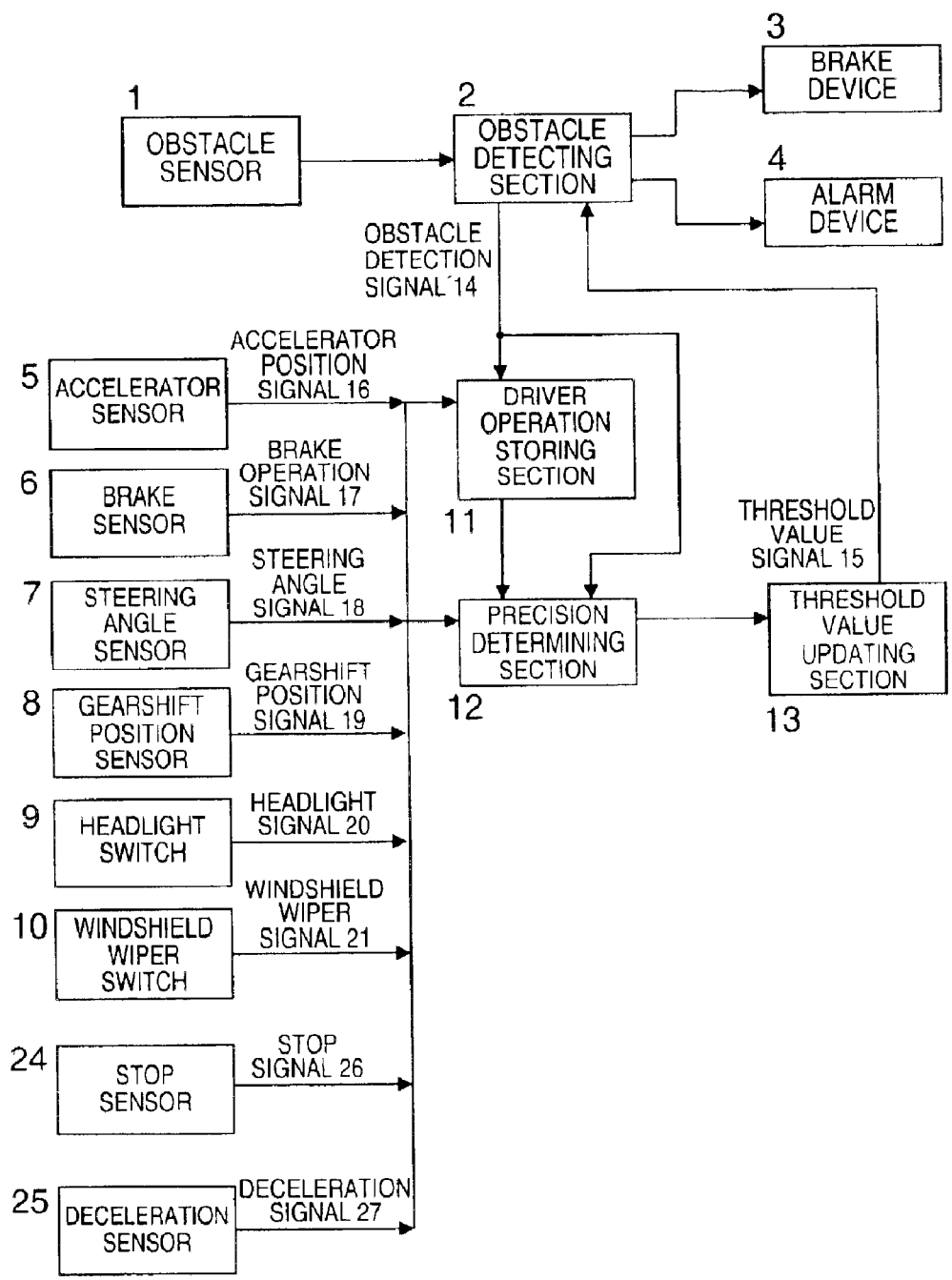
FIG. 1 is a block diagram showing functional components of a vehicle obstacle detecting apparatus in accordance with one embodiment of the present invention.

Referring initially to FIG. 1, a vehicle obstacle detecting apparatus is diagrammatically illustrated in accordance with one embodiment of the present invention. The vehicle obstacle detecting apparatus basically comprises an obstacle sensor 1, an obstacle detecting section 2, a brake device 3, an alarm device 4, an accelerator sensor 5, a brake sensor 6, a steering angle sensor 7, a gearshift position sensor 8, a headlight switch 9, a windshield wiper switch 10, a driver operation storing section 11, a precision determining section 12, a threshold value updating section 13, a stop sensor 24 and a deceleration sensor 25. In the vehicle obstacle detecting apparatus in accordance with this embodiment of the present invention, the precision determining section 12 is configured to determine if a detection result obtained from the obstacle detecting section 2 is correct by monitoring driver operations based preferably on the accelerator sensor 5, the brake sensor 6, the steering angle sensor 7, the gearshift position sensor 8, the headlight switch 9, the windshield wiper switch 10, the stop sensor 24 and the deceleration sensor 25. Then, the threshold value updating section 13 is configured to calculate and adjust a threshold value D that is used to determine if an obstacle exists (when detected obstacle information from the obstacle sensor 1 and pre-stored obstacle detection reference information are compared for similarity) based on the result of the determination from the precision determining section 12. Consequently, the obstacle detection precision can be studied efficiently in real time and the occurrence of detection failures (false negative obstacle detection) and incorrect detections (false positive obstacle detection) can be reduced. As a result, the obstacle detection precision can be increased.

The obstacle sensor 1 is preferably a vehicle-mounted electronic camera (hereinafter referred simply as "camera") that photographs the area around the vehicle. Of course it will be apparent to those skilled in the art from this disclosure that devices other than a camera, e.g., a laser radar or an ultrasound radar, can also be used as the obstacle sensor 1 to carry out the present invention as needed and/or desired.

The obstacle detecting section 2 preferably comprises a computer and other related peripheral devices. The obstacle detecting section 2 is configured and arranged to detect obstacles based on the detected obstacle information from the obstacle sensor 1 and output an obstacle detection signal 14 indicative of a positive obstacle determination, as explained in more detail below. In accordance with its detection results, the obstacle detecting section 2 is further configured to control the brake device 3 to brake or decelerate the vehicle, and the alarm device 4 to output an alarm signal that notifies the driver of a detected obstacle. It will be apparent to those skilled in the art from this disclosure that devices such as lamps, buzzers, chimes, and voice alarm devices can be utilized as the alarm device 4. The alarm device and/or the brake device can be considered as a vehicle response section.

The accelerator sensor 5, the brake sensor 6, the steering angle sensor 7, gearshift position sensor 8, the headlight switch 9, the windshield wiper switch 10, the stop sensor 24 and the deceleration sensor 25 all serve as sensors that detect operations performed by a driver, i.e., driver operations, and output various driver operation signals to the driver operation storing section 11 and the precision determining section 12, as shown in FIG. 1. More specifically, the accelerator sensor 5 is configured and arranged to detect an accelerator operation amount and produce an accelerator position signal 16 indicative of an accelerator operation amount, which is sent to the driver operation storing section 11 and the precision determining section 12. The brake sensor 6 is configured and arranged to detect a brake operation and produce a brake operation signal 17 indicative of a brake operation, which is sent to the driver operation storing section 11 and the precision determining section 12. The steering angle sensor 7 is configured and arranged to detect a steering angle and produce a steering angle signal 18 indicative of a steering angle, which is sent to the driver operation storing section 11 and the precision determining section 12. The gearshift position sensor 8 is configured and arranged to detect a gearshift position and produce a gearshift position signal 19 indicative of a gearshift position, which is sent to the driver operation storing section 11 and the precision determining section 12. The headlight switch 9 is configured and arranged to detect a headlight switch operation and produce a headlight signal 20 indicative of a headlight operation, which is sent to the driver operation storing section 11 and the precision determining section 12. The windshield wiper switch 10 is configured and arranged to detect a windshield wiper operation and produce a windshield wiper signal 21 indicative of a windshield wiper operation, which is sent to the driver operation storing section 11 and the precision determining section 12. The stop sensor 24 is configured and arranged to detect a stop state of the vehicle and produce a stop signal 26 indicative of a stop state of the vehicle, which is sent to the driver operation storing section 11 and the precision determining section 12. The deceleration sensor 25 is configured and arranged to detect a deceleration of the vehicle and produce a deceleration signal 27 indicative of a deceleration of the vehicle, which is sent to the driver operation storing section 11 and the precision determining section 12.

The driver operation storing section 11 is configured and arranged to store normal or average driver operations performed by the driver when an obstacle around the vehicle is detected as an average operation characteristic data. More specifically, the driver operation storing section 11 is configured and arranged to store the normal or average driver operations determined based on the aforementioned various driver operation signals when the obstacle detection signal 14 is output from the obstacle detecting section 2, as explained in more detail below.

The precision determining section 12 is configured and arranged to predict a behavior of the driver or expected driver operation(s) based on the average operation characteristic data stored in the driver operation storing section 11 when the obstacle detection signal 14 is output by the obstacle detecting section 2. Also, the precision determining section 12 is configured and arranged to compare the expected driver operation(s) with actual driver operation(s) indicated by the various driver operation signals. The precision determining section 12 is further configured and arranged to determine a precision of a detection of the obstacle based on a difference between the expected and the actual driver operation(s), and send the determination result to the threshold value updating section 13, as explained in more detail below.

When the actual driver operation(s) substantially defers from the expected driver operation(s), the threshold value updating section 13 adjusts the threshold value D used in the obstacle detecting section 2 to detect obstacles (i.e., the threshold value D used as a reference when identifying an obstacle), and produces a threshold value signal 15 indicative of an updated threshold value, which is sent to the obstacle detecting section 2, as explained in more detail below.

The driver operation storing section 11, the precision determining section 12, and the threshold value updating section 13 can be constructed out of a computer or computers and some peripheral equipments. More specifically, the driver operation storing section 11, the precision determining section 12, and the threshold value updating section 13 preferably include one or more microcomputers with one or more control programs that control Control Processes I, II and III, as discussed below. In other words, the driver operation storing section 11, the precision determining section 12, and the threshold value updating section 13 can include conventional components such as an input interface circuit, an output interface circuit, and storage devices such as a ROM (Read Only Memory) device and a RAM (Random Access Memory) device as needed and/or desired to carry out the present invention. It will be apparent to those skilled in the art from this disclosure that the precise structure and algorithms for the driver operation storing section 11, the precision determining section 12, and the threshold value updating section 13 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Figure 2:
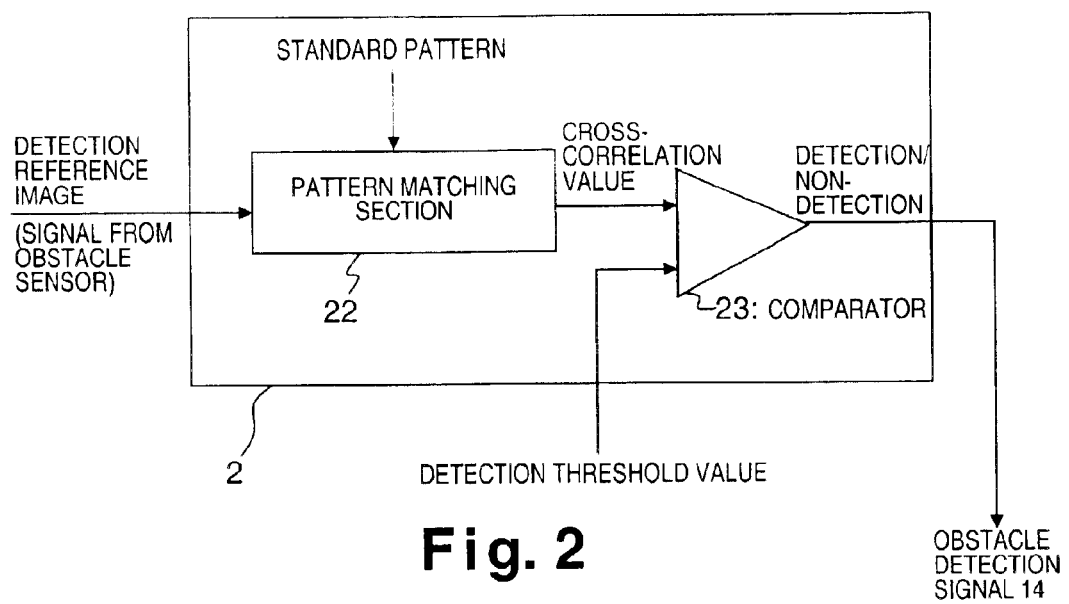
FIG. 2 is a block diagram showing an obstacle detecting section of the vehicle obstacle detecting apparatus illustrated in FIG. 1 in accordance with the one embodiment of the present invention.

FIG. 2 is a block diagram of the obstacle detecting section 2 in accordance with one preferred embodiment of the present invention. In this embodiment, a method of pattern matching is preferably used to detect an obstacle. More specifically, a pattern matching section 22 is preferably configured and arranged to compare the detected obstacle information or a detected object image (e.g., a binary image) of an object received from a camera (the obstacle sensor 1) with a pre-stored obstacle detection reference information or a pre-stored reference pattern of an obstacle or object (e.g., a diagram corresponding to another vehicle) to detect a degree of pattern similarity or a similarity value (cross-correlation value). A comparator 23 is preferably configured and arranged to compare the similarity value with the threshold value D (detection threshold value) to determine if the detected object image is indeed an obstacle. More specifically, when the obstacle detecting section 2 determines that an obstacle exists based on the similarity value and the threshold value, the obstacle detecting section 2 is configured to output the obstacle detection signal 14. One point of the preferred embodiment of the present invention is directed to setting the threshold value D. Preferably, the arrangement and structure of the obstacle detecting section 2 utilizes a conventional obstacle detecting method based on image processing. Of course, it is apparent to those skilled in the art from this disclosure that the obstacle detecting section 2 is not limited to a device that utilizes pattern matching. Thus, any device that determines if an obstacle exists by comparing a detection result with a threshold value can be used as the obstacle detecting section 2 to carry out the present invention.

Figure 3:
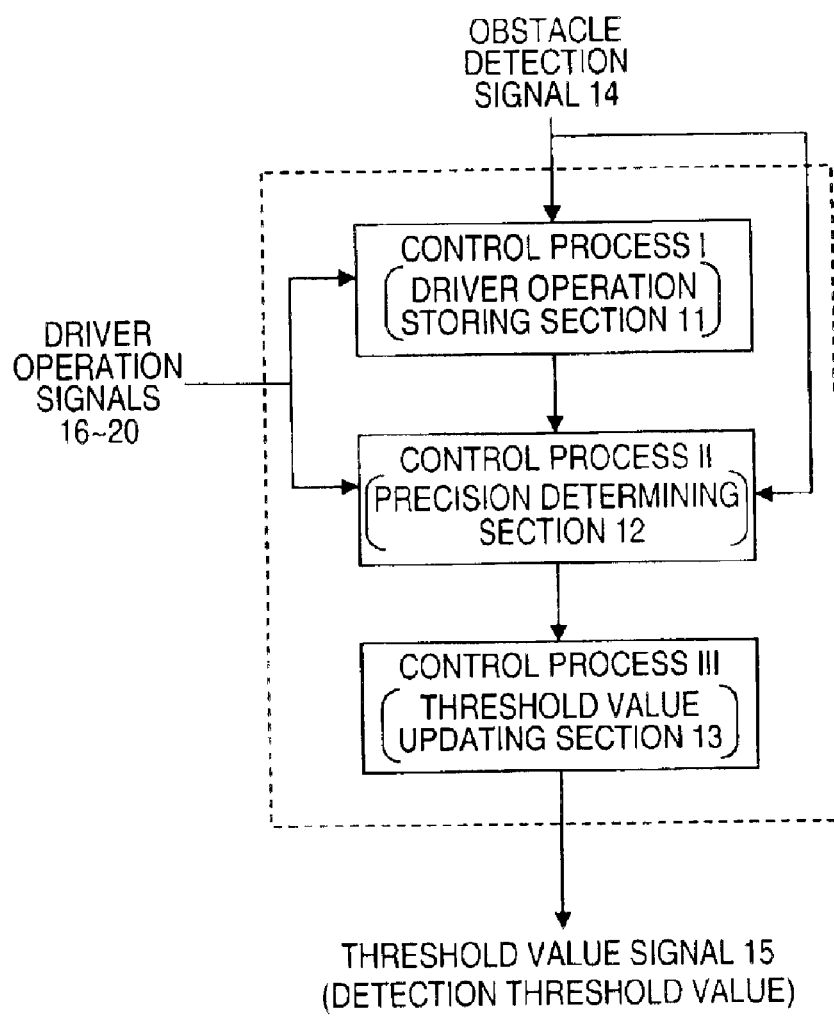
FIG. 3 is a block diagram showing Control Processes I, II and III that are executed in a driver operation storing section, a precision determining section, and a threshold value updating section, respectively, of the vehicle obstacle detecting apparatus illustrated in FIG. 1 in accordance with the one embodiment of the present invention.

FIG. 3 diagrammatically illustrates a flow of control processes executed in the driver operation storing section 11, the precision determining section 12, and the threshold value updating section 13. As shown FIG. 3, Control Process I is executed in the driver operation storing section 11, Control Process II is executed in the precision determining section 12, and Control Process III is executed in the threshold value updating section 13.

Control Process I includes a process of storing information regarding what operations the driver normally performs (average driver operations) when an obstacle is detected, and a process of arranging that information into a database.

Control Process II includes a process of predicting behaviors (expected driver operations) of the driver based on the database of the average driver operations determined based on the driver operations detected in the past, and a process of comparing the expected driver operations with the actual driver operations to determine a precision of detection of an obstacle. Consider, for example, a case in which an obstacle is detected by the obstacle detecting section 2 (e.g., in which the alarm device 4 issues an alarm upon detection of the obstacle) and the expected driver operations based on the average driver operations stored in the database indicates that the driver will operate the brake. If the driver does not operate the brake, then it is determined that the obstacle detecting section 2 committed an incorrect detection or a false positive obstacle detection, i.e., an object was incorrectly detected as an obstacle when in fact the object was not an obstacle. On the other hand, consider a case in which the obstacle detecting section 2 does not detected an obstacle even though the driver performs operations so as to avoid an obstacle. In this case, the precision determining section 12 determines that the obstacle detecting section 2 committed a detection failure or a false negative obstacle detection, i.e., no obstacle was detected even though an obstacle in fact existed.

Control Process III includes a process of adjusting the threshold value D (the detection threshold value shown in FIG. 2) in response to the result of the determination of the obstacle detection precision obtained in Control Process II, as explained in more detail below.

Referring now to FIGS. 4–7, processes performed in Control Process I that is executed in the driver operation storing section 11 will be described in detail.

Figure 4:
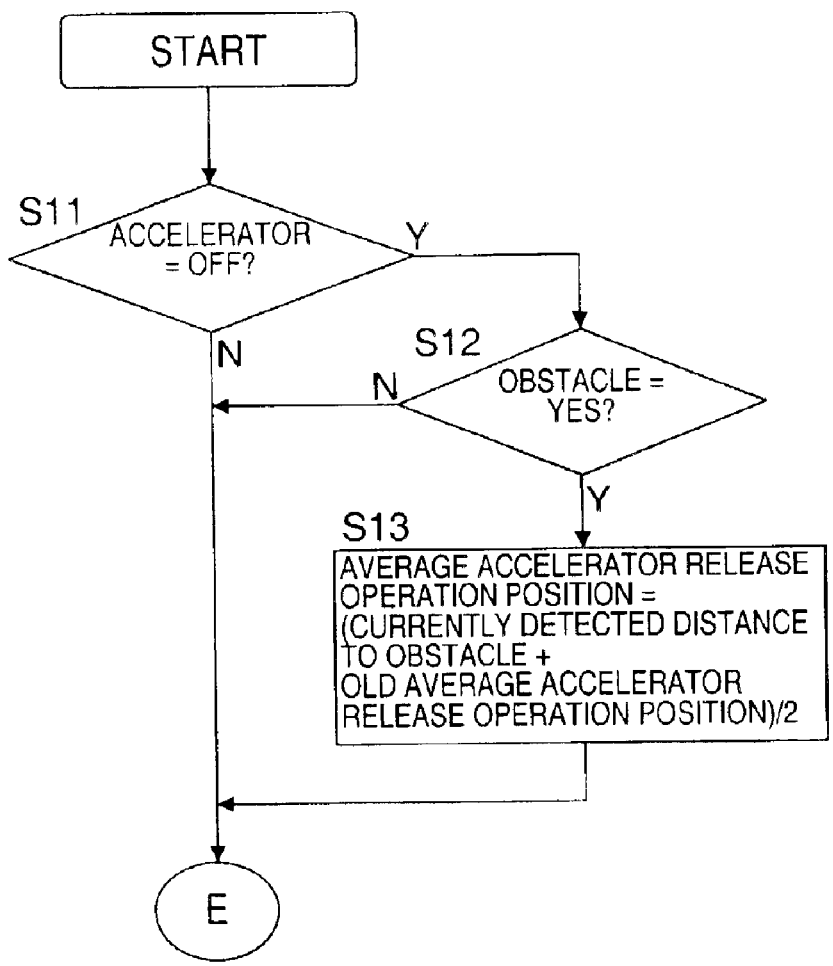
FIG. 4 is a flowchart showing a first part of Control Process I executed in the driver operation storing section of the vehicle obstacle detecting apparatus illustrated in FIG. 1 in accordance with the one embodiment of the present invention.

FIG. 4 illustrates storing an average accelerator release operation position as part of the average operation characteristic data when the obstacle detecting section 2 detects an obstacle. The driver operation storing section 11 is configured to determine an accelerator release operation position based on a driver operation indicated by the accelerator position signal 16, which is received from the accelerator sensor 5. The accelerator release operation position is preferably expressed as a value indicative of a distance from the vehicle to the detected obstacle in cases in which the accelerator is released (accelerator OFF) at the point in time when the obstacle is detected. The average accelerator release operation position is an average value of the accelerator release operation positions. Moreover, it is also acceptable to store a value indicative of the average accelerator release operation position in a form of a time value obtained by dividing the distance by a vehicle speed at the point in time when the accelerator release operation began. This time value is called TTC (time to collision). Furthermore, the distance from the vehicle to the detected object can be determined based on information from the obstacle sensor 1.

In step S11 of FIG. 4, the driver operation storing section 11 is configured to determine if the accelerator is OFF (throttle closed). If the accelerator is OFF (Yes), then the driver operation storing section 11 is configured to proceed to step S12 where it determines if an obstacle exists. More specifically, the driver operation storing section 11 is configured to make the determination based on the obstacle detection signal 14. If the obstacle detection signal 14 indicates that an obstacle exists (Yes), the driver operation storing section 11 is configured to proceed to step S13 where it updates an old or prior average accelerator release operation position stored in the average operation characteristic data to a new value which can be calculated by ((currently detected distance to obstacle)+(old average accelerator return operation position))/2. The old average accelerator release operation position is the value that was stored just prior to updating and calculated based on accelerator release operations occurred so far upon detection of obstacles.

Figure 5:
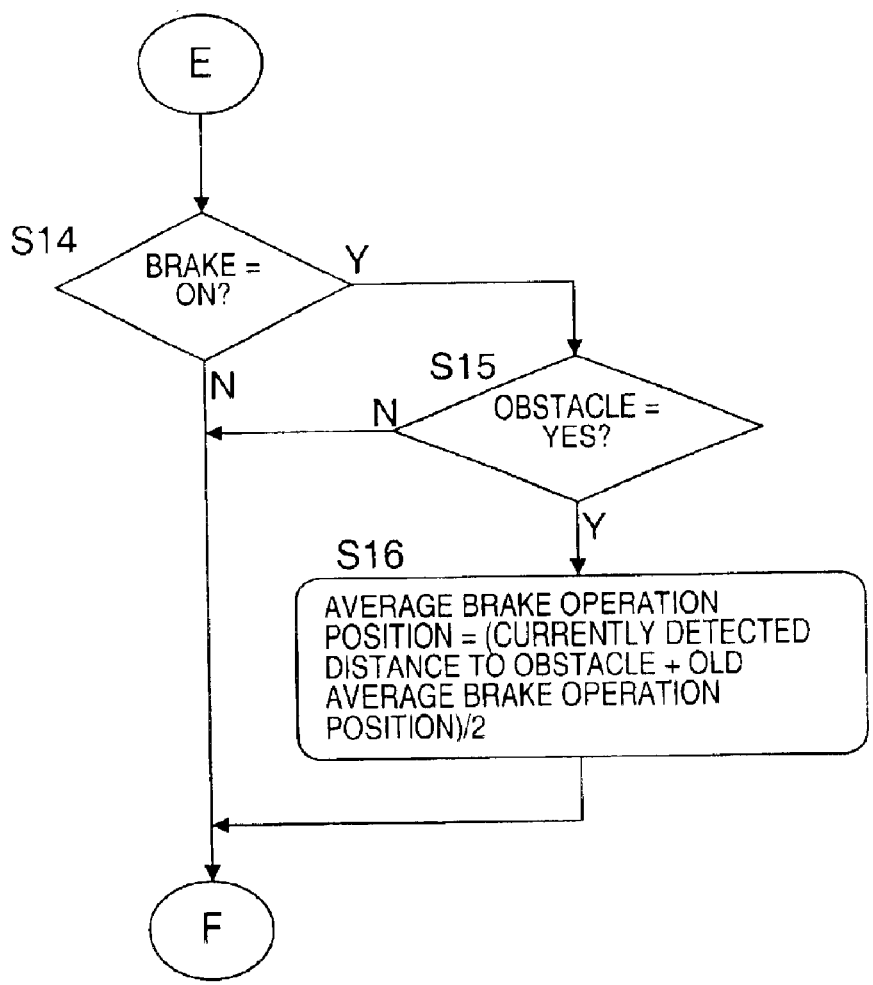
FIG. 5 is a flowchart showing a second part of Control Process I executed in the driver operation storing section of the vehicle obstacle detecting apparatus illustrated in FIG. 1 in accordance with the one embodiment of the present invention.

Next, FIG. 5 illustrates storing an average brake operation position as part of the average operation characteristic data at a point in time when the obstacle detecting section 2 detects an obstacle. The driver operation storing section 11 is configured to determine a brake operation position based on the driver operation indicated by the brake operation signal 17, which is received from the brake sensor 6. The brake operation position is preferably expressed as a value indicative of a distance from the vehicle to the detected obstacle in cases in which the brake is operated at the point in time when the obstacle is detected. The average brake operation position is an average value of the brake operation positions. It is also acceptable to store a value indicative of the average brake operation position in TTC form.

In step S14 of FIG. 5, the driver operation storing section 11 is configured to determine if the brake is ON (brake pedal depressed). If the brake is ON (Yes), then the driver operation storing section 11 is configured to proceed to step S15 where it determines if an obstacle exists. More specifically, the driver operation storing section 11 is configured to make the determination based on the obstacle detection signal 14. If the obstacle detection signal 14 indicates that an obstacle exists (Yes), the driver operation storing section 11 is configured to proceed to step S16 where it updates an old or prior average brake operation position stored in the average operation characteristic data to a new value which can be calculated by ((currently detected distance to obstacle)+(old average brake operation position))/2. The old average brake operation position is the value that was stored just prior to updating and calculated based on brake operations occurred so far upon detection of obstacles.

Figure 6:
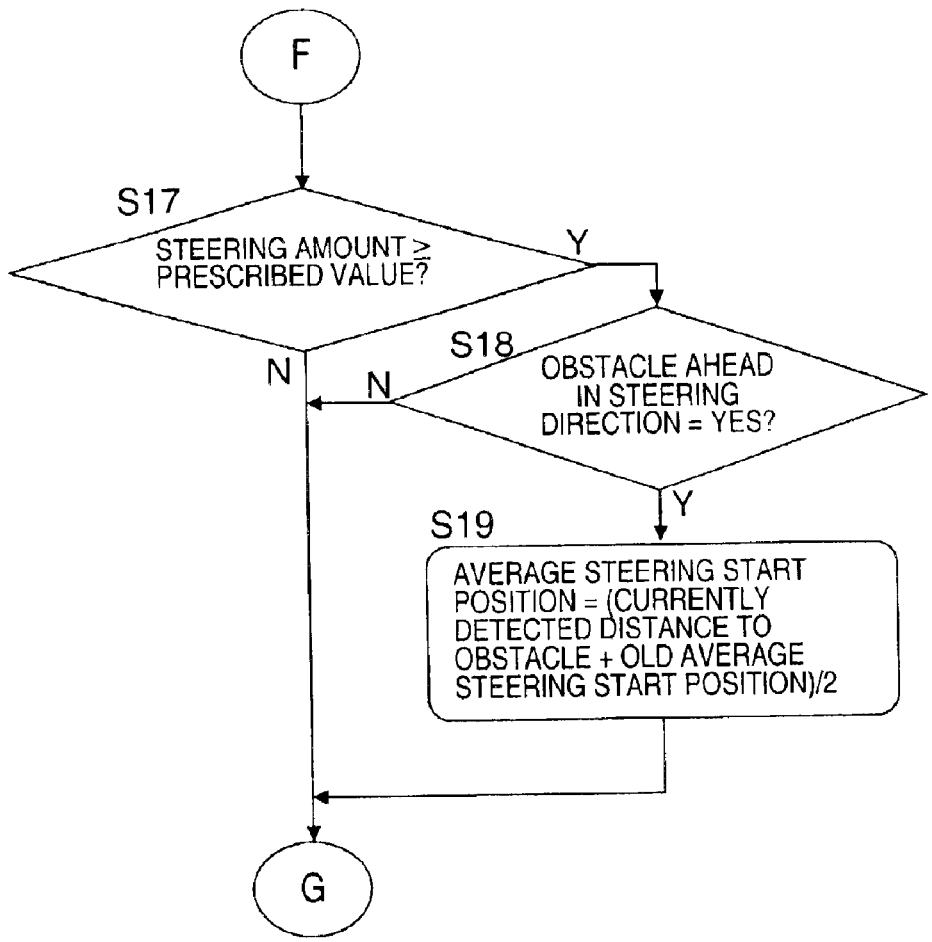
FIG. 6 is a flowchart showing a third part of Control Process I executed in the driver operation storing section of the vehicle obstacle detecting apparatus illustrated in FIG. 1 in accordance with the one embodiment of the present invention.

Next, FIG. 6 illustrates storing an average steering start position as part of the average operation characteristic data at a point in time when the obstacle detecting section 2 detects an obstacle. The driver operation storing section 11 is configured to determine a steering start position based on the driver operation indicated by the steering angle signal 18, which is received from the steering angle sensor 7. The steering start position is determined based on a position where the driver began turning the steering wheel to a large degree when an obstacle is detected. The steering start position is preferably expressed as a value indicative of a distance from the vehicle to the detected obstacle in cases in which an obstacle is detected and the driver starts turning the steering wheel to a large degree. The average steering start position is an average value of the steering start positions. It is also acceptable to store a value indicative of the steering start position in TTC form.

In step S17 of FIG. 6, the driver operation storing section 11 is configured to determine if the steering amount is greater than or equal to a prescribed value (i.e., larger than a steering amount corresponding to normal straight travel). If the steering amount is larger than the prescribed value (Yes), then the driver operation storing section 11 is configured to proceed to step S18 where it determines if an obstacle exists ahead of the vehicle in the direction in which the vehicle is being steered. The driver operation storing section 11 is configured to make the determination based on the obstacle detection signal 14. If the obstacle detection signal 14 indicates that an obstacle exists (Yes), the driver operation storing section 11 is configured to proceed to step S19 where it updates an old or prior average steering start position stored in the average operation characteristic data to a new value which can be calculated by ((currently detected distance to obstacle)+(old average steering start position))/2. The old average steering start position is the value that was stored just prior to updating and calculated based on steering operations occurred so far upon a detection of an obstacle.

Figure 7:
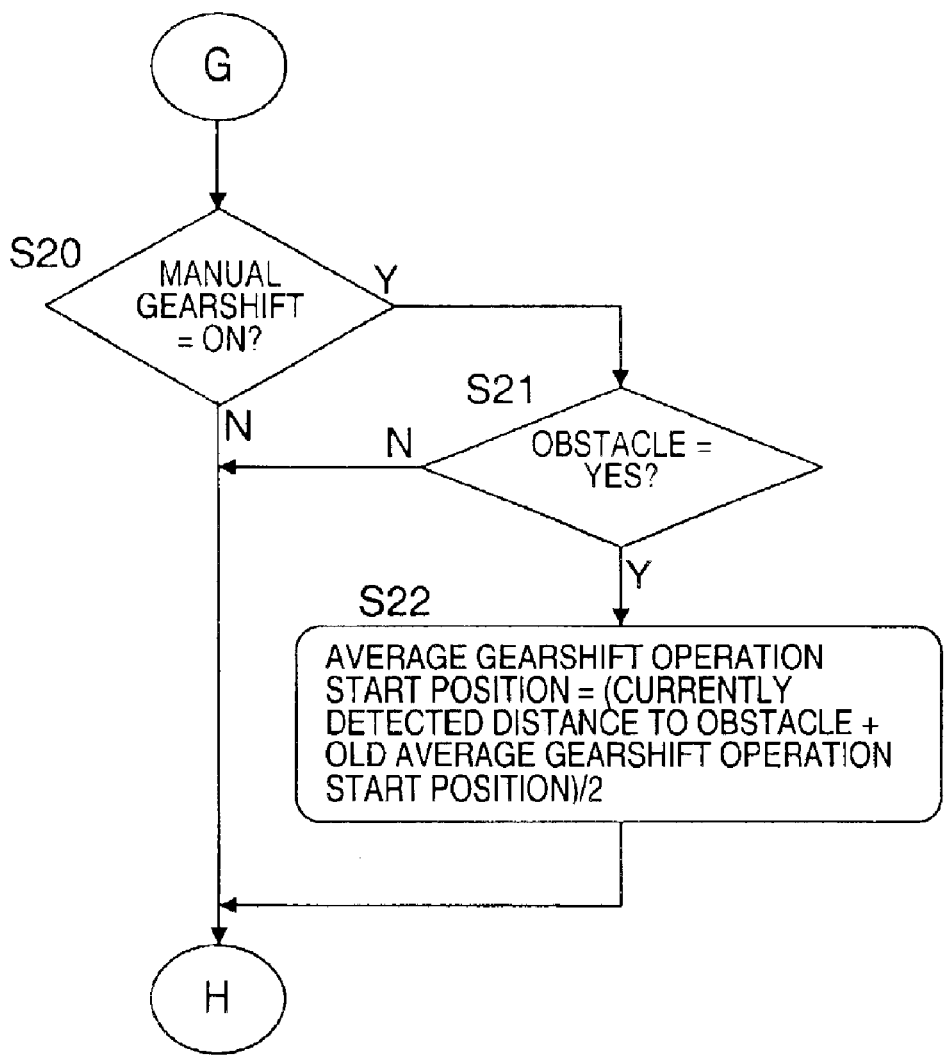
FIG. 7 is a flowchart showing a fourth part of Control Process I executed in the driver operation storing section of the vehicle obstacle detecting apparatus illustrated in FIG. 1 in accordance with the one embodiment of the present invention.

Next, FIG. 7 illustrates storing an average gearshift operation start position as part of the average operation characteristic data at a point in time when the obstacle detecting section 2 detects an obstacle. The driver operation storing section 11 is configured to determine a gearshift operation start position based the driver operation indicated by the gearshift position signal 19, which is received from the gearshift position sensor 8. The gearshift operation start position is determined based on a position where the driver operated the gearshift in order to downshift upon a detection of an obstacle. The gearshift operation start position is preferably expressed as a value indicative of a distance from the vehicle to the detected obstacle in cases in which an obstacle is detected and the driver downshifts the gearshift. It is also acceptable to store a value indicative of the gear shift operation start position in TTC form.

In step S20 of FIG. 7, the driver operation storing section 11 is configured to determine if the gearshift position signal 19 is ON (i.e., if the gearshift position has been changed). If the gearshift position signal 19 is ON (Yes), then the driver operation storing section 11 is configured to proceed to step S21 where it determines if an obstacle exists. The driver operation storing section 11 is configured to make the determination based on obstacle detection signal 14. If the obstacle detection signal 14 indicates an obstacle exists (Yes), the driver operation storing section 11 is configured to proceed to step S22 where it updates an old or prior average gearshift operation start position stored in the average operation characteristic data to a new value which can be calculated by ((currently detected distance to obstacle)+(old average gearshift operation start position))/2. The old average gearshift operation start position is the value that was stored just prior to updating and calculated based on gearshift operations occurred so far upon detection of obstacles.

Referring now to FIGS. 8 to 11, Control Process II executed in the precision determining section 12 will be described in detail. In Control Process II, the precision determining section 12 is configured to compare the predicted value or the expected driver operation(s) with the actual behavior or the actual driver operation(s) when an obstacle is detected. Thus, the precision determining section 12 monitors the effect of detecting the obstacle and issues an alarm and/or executes a vehicle control or response operation(s) based on the behavior of the driver.

Figure 8:
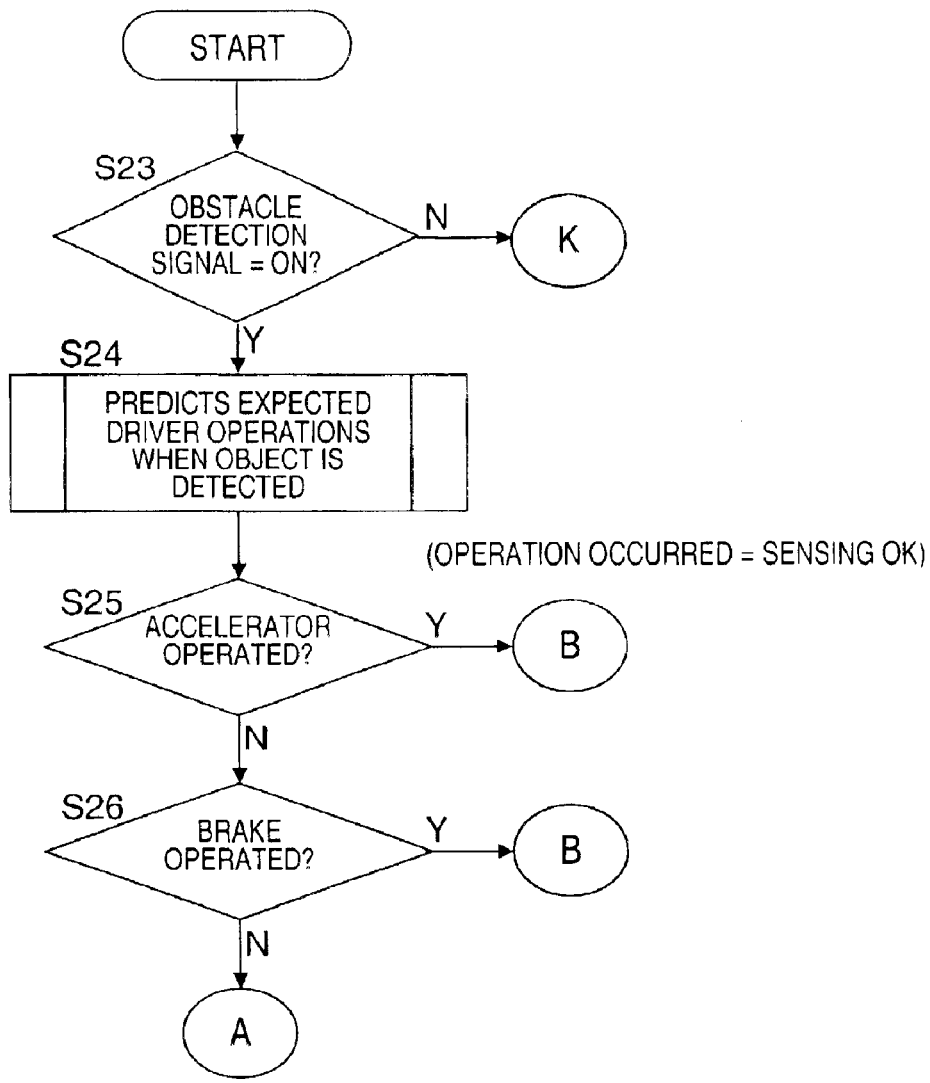
FIG. 8 is a flowchart showing a first part of Control Process II executed in the precision determining section of the vehicle obstacle detecting apparatus illustrated in FIG. 1 in accordance with the one embodiment of the present invention.
Figure 9:
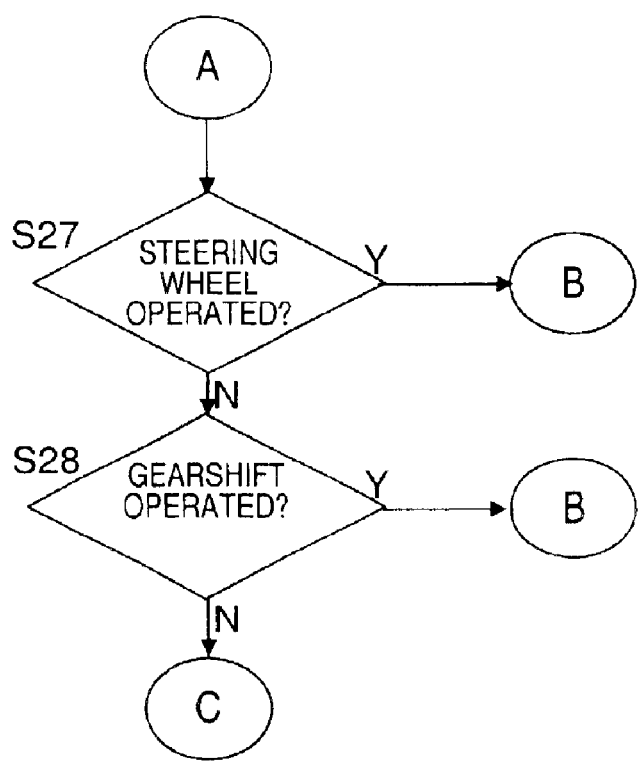
FIG. 9 is a flowchart showing a second part of Control Process II executed in the precision determining section of the vehicle obstacle detecting apparatus illustrated in FIG. 1 in accordance with the one embodiment of the present invention.

First, in step S23 of FIG. 8, the precision determining section 12 is configured to determine if the obstacle detection signal 14 is ON. If the obstacle detection signal 14 is not ON (No), the precision determining section 12 is configured to proceed to step S31 of FIG. 11, as explained in more detail below. If the obstacle detection signal 14 is ON in step S23 (Yes), the precision determining section 12 is configured to proceed to step S24 where it predicts the expected driver operations that the driver will perform when an obstacle is detected based on information stored in the driver operation storing section 11. For example, when an obstacle is detected, it can be predicted that the driver will perform such operations as releasing the accelerator (accelerator OFF), operating the brake, turning the steering wheel, and/or operating the gearshift at average operating distances for that particular driver as determined in steps S11–S22 of FIGS. 4–7.

In step S25, the precision determining section 12 is configured to determine if the accelerator was operated or not based on the accelerator position signal 16. If the accelerator position signal 16 indicates the accelerator was operated (Yes), then the precision determining section 12 determines that the driver reacted to the obstacle and released the accelerator. Thus, the obstacle detection by the obstacle detecting section 2 was correct when it determined that an obstacle existed. Then, the precision determining section 12 is configured to proceed to step S29 of FIG. 10. If the accelerator position signal 16 does not indicate the accelerator was operated (No) in step S25, then the precision determining section 12 is configured to proceed to step S26.

In step S26, the precision determining section 12 is configured to determine if the brake was operated or not based on the brake operation signal 17. If the brake operation signal 17 indicates the brake was operated (Yes), then the precision determining section 12 determines that the driver reacted to the obstacle and operate the brake. Thus, the obstacle detection by the obstacle detecting section 2 was correct when it determined that an obstacle existed. Then, the precision determining section 12 is configured to proceed to step S29 of FIG. 10. If the brake operation signal 17 does not indicate the brake was operated (No) in step S26, the precision determining section 12 is configured to proceed to step S27 of FIG. 9.

In step S27, the precision determining section 12 is configured to determine if the steering wheel was operated or not based on the steering angle signal 18. If the steering angle signal 18 indicates the steering wheel was operated, then the precision determining section 12 determines that the driver reacted to the obstacle and operates the steering wheel. Thus, the obstacle detecting section 2 was correct when it determined that an obstacle existed. Then, the precision determining section 12 is configured to proceed to step S29 of FIG. 10. If the steering angle signal 18 does not indicate the steering wheel was operated (No) in step S27, the precision determining section 12 is configured to proceed to step S28.

In step S28, the precision determining section 12 is configured to determine if the gearshift was operated or not based on the gearshift position signal 19. If the gearshift position signal 19 indicates the gearshift was operated (Yes), then the precision determining section 12 determines that the driver reacted to the obstacle and operates the gearshift to downshift. Thus, the obstacle detecting section 2 shown in FIG. 1 was correct when it determined that an obstacle existed. Then, the precision determining section 12 proceeds to step S29 of FIG. 10. If the gearshift position signal 19 does not indicate the gearshift was operated (No) in step S28, the precision determining section 12 is configured to proceed to step S37 of FIG. 12.

Figure 10:
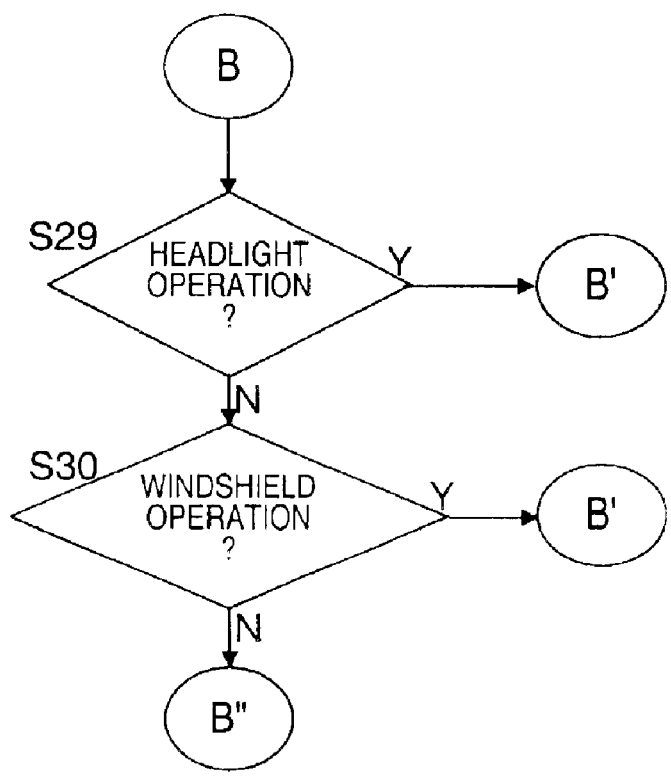
FIG. 10 is a flowchart showing a third part of Control Process II executed in the precision determining section of the vehicle obstacle detecting apparatus illustrated in FIG. 1 in accordance with the one embodiment of the present invention.

If the obstacle detecting section 2 was determined to be correct in determining an obstacle existed in any one of steps S25 to S28, then the precision determining section 12 is configured to proceed to step S29 of FIG. 10.

In step S29, the precision determining section 12 is configured to determine if headlights were operated (i.e., turned on or switched to high beam or low beam) based on the headlight signal 20 just after the time of obstacle detection. If the headlight signal 20 indicates the headlights were operated (Yes), the precision determining section 12 is configured to proceed to step S35 of FIG. 12. If the headlight signal 20 does not indicate the headlights were operated (No) in step S29, the precision determining section 12 is configured to proceed to step S30.

In step S30, the precision determining section 12 is configured to determine if windshield wipers were operated (i.e., turned on or switched to high speed or low speed) based on the windshield wiper signal 21 just after the time of obstacle detection. If the windshield wiper signal 21 indicates the windshield wipers were operated (Yes), the precision determining section 12 is configured to proceed to step S35 of FIG. 12. If the windshield wiper signal 21 does not indicate the windshield wipers were operated (No) in step S30, the precision determining section 12 is configured to proceed to step S36 of FIG. 12.

The control processes executed in steps S29 and S30 are slightly different from the control processes executed in the previous steps. The control processes of steps S29 and S30 are utilized to determine that the driver has intentionally confirmed an object in front of the vehicle, i.e., the driver operates the headlights and/or the windshield wipers, in response to the alarm from the alarm device 4. When the driver performs such operations in response to the alarm and intentionally confirms an object in front of the vehicle by operating the headlights or the windshield wipers, the precision determining section 12 determines that the precision of the obstacle detection by the obstacle detecting section 2 is highly reliable (i.e., the determination that an obstacle exists is highly reliable). Thus, the threshold value D is modified to a smaller value as described later. It will be apparent to those skilled in the art from this disclosure that the control processes in steps S29 and S30 are preferably included in the structure of the present invention but one can also carry out the present invention without these steps.

Figure 11:
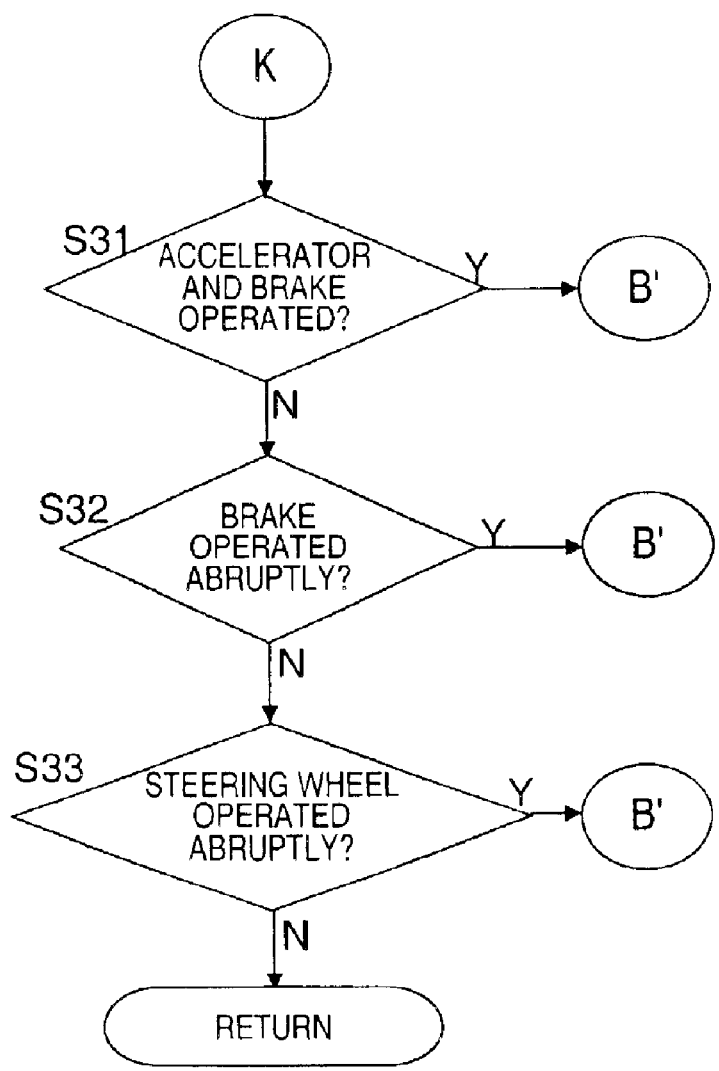
FIG. 11 is a flowchart showing a fourth part of Control Process II executed in the precision determining section of the vehicle obstacle detecting apparatus illustrated in FIG. 1 in accordance with the one embodiment of the present invention.

FIG. 11 shows a flow of processes for detecting a detection failure or a false negative obstacle detection of the obstacle detecting section 2 in Control Process II executed in the precision determining section 12. These processes are executed when the obstacle detecting section 2 does not detect an obstacle (No) in step S23 of FIG. 8.

If step S23 of FIG. 8 is No, then the precision determining section 12 is configured to proceed to step S31 of FIG. 11 where it determines if the accelerator and brake were both operated such that the vehicle came to a stop state. The stop state of the vehicle is preferably determined by the stop sensor 24. The stop sensor 24 is preferably configured to determine the stop state of the vehicle based on whether there is wheel rotation or not. Of course, if will be apparent to those skilled in the art from this disclosure that any device or sensor can be utilized as the stop sensor 24 as long as it can determine a stop state of the vehicle. If the precision determining section 12 determines that there were brake and accelerator operations such that the vehicle came to the stop state (Yes) in step S31, then the precision determining section 12 is configured to proceed to step S35 of FIG. 12. If the precision determining section 12 determines that there were no brake and accelerator operations such that the vehicle came to the stop state (No) in step S31, then the precision determining section 12 is configured to proceed to step S32.

In step S32, the precision determining section 12 is configured to determine if an abrupt braking operation has been performed. The abrupt braking operation is preferably detected by checking if the deceleration of the vehicle is greater than or equal to a prescribed value. The deceleration of the vehicle is preferably detected by using the deceleration sensor 25. Of course, if will be apparent to those skilled in the art from this disclosure that any device or sensor can be utilized as the deceleration sensor 25 as long as it can determine a deceleration of the vehicle. Moreover, any method and/or device other than checking if the deceleration of the vehicle is greater than or equal to a prescribed value can be used if the method and/or device can detect an abrupt brake operation. If it is determined that there is an abrupt braking operation (Yes) in step S32, the precision determining section 12 is configured to proceed to step S35 of FIG. 12. If the precision determining section 12 determines that there is no abrupt braking operation (No) in step S32, the precision determining section 12 is configured to proceed to step S33.

In step S33, the precision determining section 12 is configured to determine if an abrupt steering wheel operation has been performed. The abrupt steering wheel operation is preferably detected by checking if a rate of change of the steering angle is greater than or equal to a prescribed value. The steering angle is preferably detected by using the steering angle sensor 7. Of course, it will be apparent to those skilled in the art from this disclosure that any method and device can be used if such method and device can determine whether there is an abrupt steering operation or not. If it is determined that there is an abrupt steering operation (Yes) in step S33, the precision determining section 12 is configured to proceed to step S35 of FIG. 12.

When the accelerator and brake were both operated such that the vehicle came to a stop, an abrupt braking operation was performed, or an abrupt steering operation was performed, i.e., Yes in any one of steps S31–S33, it is determined that the driver detected an obstacle and performed an operation to avoid the obstacle. When the operation to avoid the obstacle occurs while there was no obstacle detected by the obstacle detecting section 2, it is determined that the obstacle detecting section 2 experienced a detection failure or a false negative obstacle detection.

Figure 12:
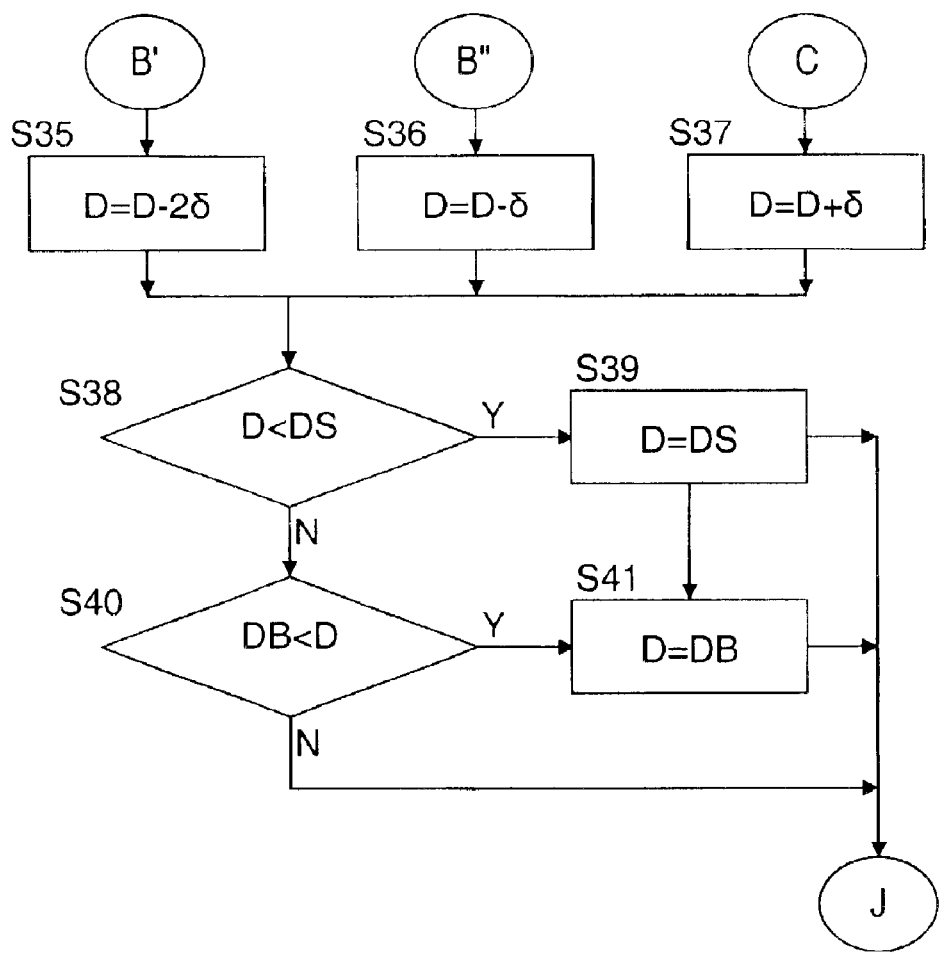
FIG. 12 is a flowchart showing a first part of Control Process III executed in the threshold value updating section of the vehicle obstacle detecting apparatus illustrated in FIG. 1 in accordance with the one embodiment of the present invention.
Figure 13:
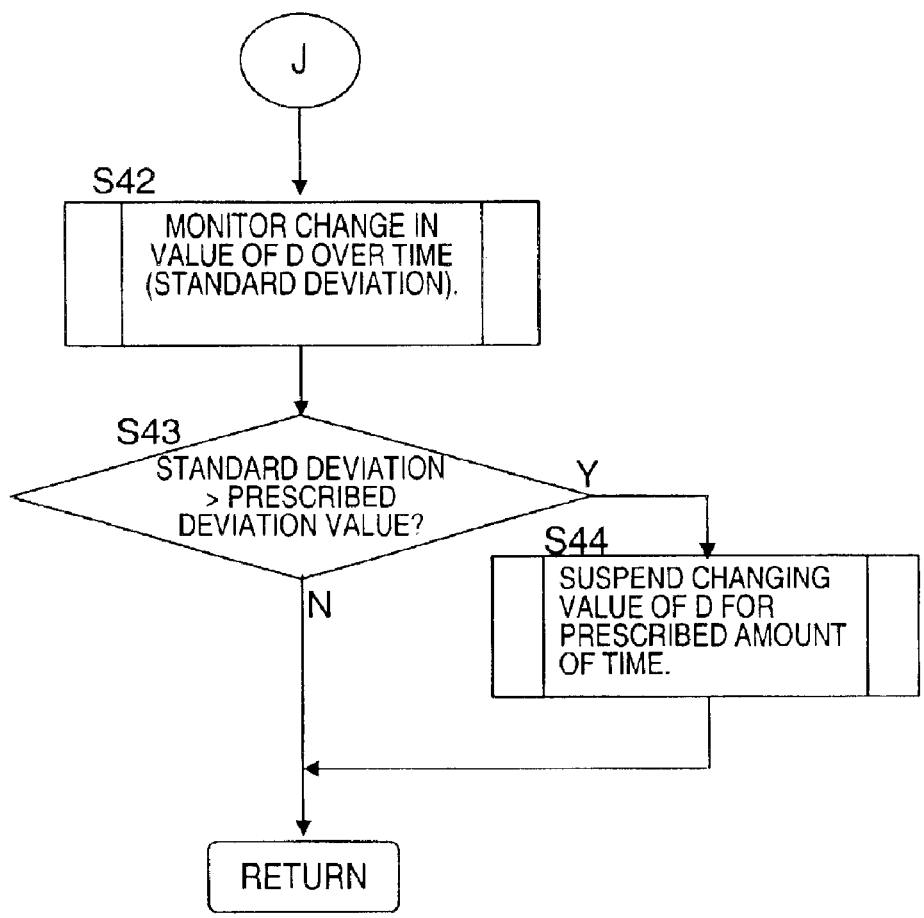
FIG. 13 is a flowchart showing a second part of Control Process III executed in the threshold value updating section of the vehicle obstacle detecting apparatus illustrated in FIG. 1 in accordance with the one embodiment of the present invention.

FIGS. 12 and 13 are flowcharts showing the details of Control Process III, which is executed in the threshold value updating section 13. In Control Process III, an updated threshold value is calculated in accordance with the determination obtained from the precision determining section 12 in Control Process II.

Step S35 of FIG. 12 shows a processing executed when the control flow in Control Process II is led to step S35. When the control flow proceeds from steps S29 or S30 of FIG. 10 to step S35 of FIG. 12, it is determined that a precision of the obstacle detection is very high (highly reliable). In such a case, the threshold value D is reduced to an updated value (D−2δ (prescribed adjustment value)) to increase the detection sensitivity of the vehicle obstacle detecting apparatus. More specifically, reducing the threshold value D to a small value results in the obstacle detecting section 2 detecting an obstacle even if the similarity value between the detected obstacle image pattern and the pre-stored reference pattern is relatively small. On the other hand, when the control flow proceeds from steps S31, S32 or S33 of FIG. 11 to step S35 of FIG. 12, it is determined that a detection failure (false negative obstacle detection) has occurred, i.e., an obstacle was not detected while a driver operation indicates there is an obstacle. Here again, the threshold value D is reduced to an updated value (D−2δ (prescribed adjustment value)) so that an obstacle will be recognized even when the similarity value is low, and thus, the detection sensitivity increases.

Step S36 shows a processing executed when the control flow in Control Process II is led to step S36. When the control flow proceeds from step S30 of FIG. 10 to step S36 of FIG. 12, it is determined that the precision of the obstacle detection is relatively high (reliable) but not as high as in the case proceeding from steps S29 or S30 of FIG. 10 to step S35. Thus, the threshold value D is reduced slightly to an updated value (D−δ (prescribed adjustment value)). Since the threshold value D is slightly reduced, the detection sensitivity of the vehicle obstacle detecting apparatus slightly increases.

Step S37 shows a processing executed when the control flow in Control Process II is led to step S37. When the control flow proceeds from step S28 of FIG. 9 to step S37 of FIG. 12, even though an obstacle was detected and an alarm was issued, the driver did not perform any operations. Thus, it is determined that the obstacle detecting section 2 erroneously detected an obstacle (false positive obstacle detection). Therefore, the threshold value D is increased to an updated value (D+δ (prescribed adjustment value)) to decrease the detection sensitivity of the vehicle obstacle detecting apparatus. More specifically, increasing the threshold value D to a large value results in the obstacle detecting section 2 not detecting there is an obstacle even if the similarity between the detected image pattern and the standard pattern is relatively large.

Steps S38 to S41 of FIG. 12 execute processes for limiting a range over which the threshold value D is varied. A maximum threshold value DB and a minimum threshold value DS are established. Thus, the threshold value D is limited to values in the range between the maximum threshold value DB and the minimum threshold value DS.

In step S38, the threshold value updating section 13 is configured to determine if the threshold value D after updated is smaller than the minimum threshold value DS. If the threshold value D after updated is smaller than the minimum threshold value DS, the threshold value updating section 13 is configured to proceed to step S39 where it sets the threshold value D to DS. If the threshold value D after updated is not smaller than the minimum threshold value DS, the threshold value updating section 13 is configured to proceed to step S40. In step S40, the threshold value updating section 13 is configured to determine if the threshold value D after updated is larger than the maximum threshold value DB. If the threshold value D after updated is larger than the maximum threshold value DB, the threshold value updating section 13 is configured to proceed to step S41 where it sets the threshold value D to DB. By limiting the value of the threshold value D to values in a range between the maximum threshold value DB and the minimum threshold value DS, the threshold value D can be prevented from becoming excessively large or small.

FIG. 13 shows a flow of a process to suspend changing of the threshold value D when the threshold value D fluctuates in an unstable manner.

First, in step S42, the threshold value updating section 13 is configured to monitor the change in the threshold value D over time and calculate a standard deviation. In step S43, the threshold value updating section 13 determines if the standard deviation is larger than a prescribed deviation value. If the standard deviation is larger than the prescribed deviation value (Yes) in step S43, the threshold value updating section 13 is configured to proceed to step S44 where it suspends changing the threshold value D for a prescribed amount of time. This processing makes it possible to prevent the obstacle detection results from becoming unstable due to fluctuations of the threshold value D.

Thus, in the vehicle obstacle detecting apparatus in accordance with this preferred embodiment of the present invention, the threshold value D is preferably updated in accordance with the four precision determinations by the precision determining section 12: a false positive obstacle detection, a reliable obstacle detection, a highly reliable obstacle detection and a false negative obstacle detection.

When the obstacle detecting section 2 detects an obstacle exists but the driver does not perform a deceleration operation (accelerator OFF), a brake operation, a steering avoidance operation, or a downshift operation (gearshift), it determines that the obstacle detecting section 2 detected an obstacle in error (the false positive obstacle detection). In other words, the detection sensitivity is too high, and thus, the obstacle detecting section 2 erroneously detected an object that was not an obstacle as an obstacle. Therefore, the threshold value D is increased by δ (prescribed adjustment value) and the detection sensitivity is thereby reduced. As a result, the possibility of not detecting an obstacle when the similarity is relatively large is increased. This processing corresponds to the path that leads from step S28 in FIG. 9 to the calculation shown in step S37 of FIG. 12.

When the obstacle detecting section 2 detects that an obstacle exists and the driver performs at least one operation among a deceleration operation (accelerator OFF), a braking operation, a steering avoidance operation, and a downshifting operation (gearshift), it is determined that the obstacle detecting section 2 detected an obstacle correctly (the reliable obstacle detection). Thus, the threshold value D is decreased by δ (prescribed adjustment value). As a result, the detection sensitivity increases and the possibility of detecting an obstacle when the similarity is small is increased. This processing corresponds to the path that leads from steps S30 in FIG. 10 to the calculation shown in step S36 of FIG. 12.

When the obstacle detecting section 2 detects that an object exists and the driver performs at least one operation among a deceleration operation (accelerator OFF), a braking operation, a steering avoidance operation, and a downshifting operation (gearshift) and also operates at least one of the headlights and the windshield wipers, it is determined that the obstacle detecting section 2 detected an obstacle with high precision (the highly reliable obstacle detection). Thus, the threshold value D is decreased by 2δ (prescribed adjustment value). As a result, the detection sensitivity increases by a large amount and the possibility of detecting an obstacle when the similarity is relatively small is increased even further. This processing corresponds to the paths that lead from steps S29–S33 in FIGS. 10 and 11 to the calculation shown in step S35 of FIG. 12.

When the driver decelerates the vehicle to a stop, steers so as to avoid something, or operates the accelerator or steering wheel in an abrupt manner even though the obstacle detecting section 2 has not detected an object, it is determined that the obstacle detecting section 2 failed to detect an obstacle (the false negative obstacle detection). Thus, the threshold value D is reduced by 2δ (prescribed adjustment value). As a result, the detection sensitivity is increased by a large amount and the possibility of detecting an obstacle when the similarity is small is increased further. This processing corresponds to the paths that lead from steps S31–S33 in FIG. 11 to the calculation shown in step S35 of FIG. 12.

Moreover, it will be apparent to those skilled in the art from this disclosure that the processes other than the processes described above can be utilized to determine the precision of the obstacle determination by the obstacle detection section 2.

For example, when the obstacle detecting section 2 has detected that an object exists and the driver accelerates or steers toward the detected object, it is determined that the obstacle detecting section 2 detected the object in error. Such determination can be accomplished in a situation where the detection signal is ON (object has been detected) in step S23 of FIG. 8 by detecting if the accelerator has been operated in the direction of causing acceleration (throttle open) or by determining the direction of the object and detecting if the steering angle is oriented in that direction. In such a case, the threshold value D is increased by δ (prescribed adjustment value) as in the previously described determination of a false negative obstacle detection. As a result, the detection sensitivity is reduced and the possibility of not detecting an obstacle when the similarity is relatively large is increased.

Moreover, it is also acceptable to include a control processes in which when the obstacle detecting section 2 has detected that an object exists and no significant difference is exhibited in the operations performed by the driver, it is determined that the obstacle detecting section 2 detected the object in error. Such determination can be accomplished by setting the threshold values used in steps S25 to S28 to values corresponding to a prescribed significant difference.

Furthermore, it is also acceptable to include control processes in which when an object is detected and a deceleration changes abruptly in comparison with a deceleration required to stop the vehicle at the position where the object exists, it is determined that a new obstacle has appeared. Then, if the obstacle detecting section 2 cannot detects the new obstacle, it is determined that the obstacle detecting section 2 failed to detect the obstacle. Such determination can be accomplished by, for example, providing a deceleration sensor and determining that a new obstacle has appeared when the vehicle decelerates at a deceleration that exceeds by a prescribed amount or greater than the deceleration that normally occurs when the vehicle obstacle detecting apparatus of the present invention detects an obstacle. Whether the obstacle detecting section 2 has detected a new obstacle can be determined based on the obstacle detection signal 14. If the new obstacle has not been detected, it is determined that the obstacle detecting section 2 could not detect the obstacle because the detection sensitivity was too low. Thus, the threshold value D is reduced as in the previously described in the determination of the false negative obstacle detection to increase the detection sensitivity.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2002-178060. The entire disclosure of Japanese Patent Application No. 2002-178060 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle obstacle detecting apparatus comprising:
   an obstacle sensor configured and arranged to detect objects around a vehicle and to output detected obstacle information;
   an obstacle detecting section configured and arranged to compare the detected obstacle information from the obstacle sensor and pre-stored obstacle detection reference information to produce a similarity value that is compared with a threshold value to determine a presence of an obstacle around the vehicle and to output a positive obstacle determination based on the similarity value and the threshold value;
   a vehicle response section configured and arranged to produce a vehicle response upon the positive obstacle determination by the obstacle detecting section;
   a driver operation storing section configured and arranged to detect a driver operation, and to store an average operation characteristic data calculated based on the driver operation;
   a precision determining section configured and arranged to determine an expected driver operation upon the positive obstacle determination by the obstacle detecting section based on the average operation characteristic data, and to compare the expected driver operation with an actual driver operation to determine a precision of a detection of the obstacle; and
   a threshold value updating section configured and arranged to adjust the threshold value based on the precision of the detection of the obstacle determined in the precision determining section.

2. The vehicle obstacle detecting apparatus as recited in claim 1, wherein
   the driver operation information storing section is further configured and arranged to detect, upon the positive obstacle determination by the obstacle detecting section, at least one of
      a distance between the vehicle and the obstacle when the driver releases an accelerator pedal,
      a distance between the vehicle and the obstacle when the driver operates a brake,
      a distance between the vehicle and the obstacle when the driver manually operates a gear to shift down, and
      a distance between the vehicle and the obstacle when the driver starts a steering operation to avoid the obstacle; and
   the driver operation information storing section is further configured and arranged to store at least one of the at least one of the distances and a time obtained by dividing the at least one of the distances by a vehicle speed at a time when the at least one of the distances was measured.

3. The vehicle obstacle detecting apparatus as recited in claim 2, wherein
   the driver operation information storing section is further configured and arranged to detect a change in an acceleration operation, a braking operation, a steering operation and a down shifting operation to detect the at least one of the distances.

4. The vehicle obstacle detecting apparatus as recited in claim 1, wherein
   the precision determining section is further configured and arranged to determine a false positive obstacle detection by the obstacle detecting section when the precision determining section determines there is no unexpected change in an acceleration operation, a braking operation, a steering operation and a down shifting operation upon the positive obstacle determination by the obstacle detecting section; and
   the threshold value updating section is further configured and arranged to increase the threshold value by a first prescribed adjustment value to reduce a sensitivity of the vehicle obstacle detecting apparatus upon the precision determining section determining the false positive obstacle detection of the obstacle detecting section.

5. The vehicle obstacle detecting apparatus as recited in claim 4, wherein
   the precision determining section is further configured and arranged to determine a reliable obstacle detection by the obstacle detecting section when an unexpected change in at least one of an acceleration operation, a braking operation, a steering operation and a down shifting operation is detected upon the positive obstacle determination by the obstacle detecting section; and
   the threshold value updating section is further configured and arranged to reduce the threshold value by a second prescribed adjustment value to increase a sensitivity of the vehicle obstacle detecting apparatus upon the precision determining section determining the reliable obstacle detection of the obstacle detecting section.

6. The vehicle obstacle detecting apparatus as recited in claim 5, wherein the precision determining section is further configured and arranged to determine a highly reliable obstacle detection by the obstacle detecting section when an unexpected change in at least one of an acceleration operation, a braking operation, a steering operation and a down shifting operation is detected, and when a change in at least one of a headlight operation and a windshield wiper operation is detected upon the positive obstacle determination by the obstacle detecting section; and the threshold value updating section is further configured and arranged to reduce the threshold value by a third prescribed adjustment value that is larger than the first prescribed value to increase the sensitivity of the vehicle obstacle detecting apparatus upon the precision determining section determining the highly reliable obstacle detection of the obstacle detecting section.

7. The vehicle obstacle detecting apparatus as recited in claim 6, wherein the precision determining section is further configured and arranged to determine a false negative obstacle detection by the obstacle detecting section when the positive obstacle determination is not output from the obstacle detecting section, and upon detection of at least one of the actual driver operation including decelerating to stop,
steering by an amount that is more than a prescribed steering amount,
a rate of change in an accelerator operation that is larger than a prescribed value, and
a rate of change in a steering operation that is larger than a prescribed value; and the threshold value updating section is further configured and arranged to reduce the threshold value by the third prescribed adjustment value to increase the sensitivity of the vehicle obstacle detecting apparatus upon the precision determining section determining the false negative obstacle detection of the obstacle detecting section.

8. The vehicle obstacle detecting apparatus as recited in claim 7, wherein the threshold value updating section is further configured and arranged to set maximum and minimum threshold values, and to adjust the threshold value in a range between the maximum threshold value and the minimum threshold value.

9. The vehicle obstacle detecting apparatus as recited in claim 8, wherein the threshold value updating section is further configured and arranged to determine a standard deviation of a change in the threshold value, and to suspend updating the threshold value for a prescribed period of time when the standard deviation is larger than a prescribed deviation value.

10. The vehicle obstacle detecting apparatus as recited in claim 6, wherein the vehicle response produced by the vehicle response section further includes a brake control.

11. The vehicle obstacle detecting apparatus as recited in claim 1, wherein the precision determining section is further configured and arranged to determine a reliable obstacle detection by the obstacle detecting section when a unexpected change in at least one of an acceleration operation, a braking operation, a steering operation and a down shifting operation is detected upon the positive obstacle determination by the obstacle detecting section; and the threshold value updating section is further configured and arranged to reduce the threshold value by a prescribed adjustment value to increase a sensitivity of the vehicle obstacle detecting apparatus upon the precision determining section determining the reliable obstacle detection of the obstacle detecting section.

12. The vehicle obstacle detecting apparatus as recited in claim 1, wherein the precision determining section is further configured and arranged to determine a highly reliable obstacle detection by the obstacle detecting section when an unexpected change in at least one of an acceleration operation, a braking operation, a steering operation and a down shifting operation is detected, and when a change in at least one of a headlight operation and a windshield wiper operation is detected upon the positive obstacle determination by the obstacle detecting section; and the threshold value updating section is further configured and arranged to reduce the threshold value by a prescribed adjustment value to increase the sensitivity of the vehicle obstacle detecting apparatus upon the precision determining section determining the highly reliable obstacle detection of the obstacle detecting section.

13. The vehicle obstacle detecting apparatus as recited in claim 1, wherein the precision determining section is further configured and arranged to determine a false negative obstacle detection by the obstacle detecting section when the positive obstacle determination is not output from the obstacle detecting section, and upon detection of at least one of the actual driver operation including decelerating to stop,
steering by an amount that is more than a prescribed steering amount,
a rate of change in an accelerator operation that is larger than a prescribed value, and
a rate of change in a steering operation that is larger than a prescribed value; and the threshold value updating section is further configured and arranged to reduce the threshold value by a prescribed adjustment value to increase the sensitivity of the vehicle obstacle detecting apparatus upon the precision determining section determining the false negative obstacle detection of the obstacle detecting section.

14. The vehicle obstacle detecting apparatus as recited in claim 1, wherein the precision determining section is further configured and arranged to determine
a false positive obstacle detection by the obstacle detecting section when the positive obstacle determination is output from the obstacle detecting section and when the actual driver operation is not detected,
a reliable obstacle detection by the obstacle detecting section when the positive obstacle determination is output from the obstacle detecting section and when the actual driver operation is detected,
a false negative obstacle detection when the positive obstacle determination is not output from the obstacle detecting section and the actual driver operation is detected; and the threshold value updating section is further configured and arranged to reduce the threshold value to increase the sensitivity of the vehicle obstacle detecting apparatus upon the precision determining section determining the reliable obstacle detection and the false negative obstacle detection of the obstacle detecting section, and to increase the threshold value to reduce the sensitivity of the vehicle obstacle detecting apparatus upon the precision determining section determining the false positive detection of the obstacle detecting section.

15. The vehicle obstacle detecting apparatus as recited in claim 1, wherein the threshold value updating section is further configured and arranged to set maximum and minimum threshold values, and to adjust the threshold value in a range between the maximum threshold value and the minimum threshold value.

16. The vehicle obstacle detecting apparatus as recited in claim 1, wherein the threshold value updating section is further configured and arranged to determine a standard deviation of a change in the threshold value, and to suspend updating the threshold value for a prescribed period of time when the standard deviation is larger than a prescribed deviation value.

17. The vehicle obstacle detecting apparatus as recited in claim 1, wherein the vehicle response produced by the vehicle response section includes an alarm.

18. The vehicle obstacle detecting apparatus as recited in claim 1, wherein the vehicle response produced by the vehicle response section includes a brake control.

19. A vehicle obstacle detecting apparatus, comprising:

obstacle detecting means for obtaining obstacle information around a vehicle;

obstacle determining means for determining a presence of an obstacle around the vehicle by comparing a similarity value between the obstacle information obtained by the object detecting means and pre-stored obstacle detection reference information with a threshold value;

responding means for controlling a response to determination of the presence of the obstacle around the vehicle;

driver operation storing means for storing an average driver operation characteristic determined based on a driver operation;

precision determining means for determining a precision of the determination of the presence of the obstacle around the vehicle by comparing the average driver operation characteristic and an actual driver operation; and threshold value adjusting means for adjusting the threshold value based on the precision of the determination of the presence of the obstacle.

20. A method of detecting a vehicle obstacle, comprising;

obtaining obstacle information around a vehicle;

comparing the object information with stored obstacle information to determine an obstacle around the vehicle based on a threshold value;

controlling a vehicle response upon determination of the obstacle;

storing an average driver operation characteristic determined based on a driver operation;

determining a precision of the determination of the obstacle based on the average driver operation and a actual driver operation; and adjusting the threshold value based on the precision of the determination of the obstacle.

* * * * *